United States Patent
Eyerly et al.

(10) Patent No.: US 6,470,243 B1
(45) Date of Patent: Oct. 22, 2002

(54) CORRECTION OF SPACECRAFT STEERING CONTROL LAW FOR UNEXPECTED ORBITAL INCLINATION EFFECTS

(75) Inventors: Bruce N. Eyerly, Torrance, CA (US); John F. Yocum, Jr., Rancho Palos Verdes, CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/607,813

(22) Filed: Jun. 30, 2000

(51) Int. Cl.[7] .............................. B64G 1/10; B64G 1/28
(52) U.S. Cl. ........................ 701/13; 701/226; 342/355; 244/171
(58) Field of Search .................... 701/13, 226; 342/355; 244/171, 164, 3.2

(56) References Cited

U.S. PATENT DOCUMENTS

| | | | | |
|---|---|---|---|---|
| 4,062,509 A | * | 12/1977 | Muhlfelder et al. | 244/166 |
| 4,084,772 A | * | 4/1978 | Muhlfeder | 244/165 |
| 4,911,385 A | * | 3/1990 | Agrawal et al. | 244/165 |
| 5,100,084 A | * | 3/1992 | Rahn et al. | 244/165 |
| 5,184,790 A | * | 2/1993 | Fowell | 244/165 |
| 5,308,024 A | * | 5/1994 | Stetson, Jr. | 244/165 |
| 5,697,582 A | * | 12/1997 | Surauer et al. | 244/168 |
| 5,791,598 A | * | 8/1998 | Rodden et al. | 244/165 |
| 5,996,941 A | * | 12/1999 | Surauer et al. | 244/165 |

* cited by examiner

*Primary Examiner*—Tan Nguyen
*Assistant Examiner*—Dalena Tran
(74) *Attorney, Agent, or Firm*—Terje Gudmestad

(57) ABSTRACT

A system and method for correcting pointing errors induced by an inclined orbit (14) for a satellite (20) that is adapted to be in an orbit having zero inclination (12). The present invention generates a yaw correcting cosine rate command (34) that is integrated (36) by a steering law having input parameters dependent upon the angle of inclination, $\Theta$, to derive a sinusoidal yaw offset. The present invention also generates a roll correcting cosine rate command (54) that is integrated (56) according to a steering law having input parameters dependent upon the angle of inclination, $\Theta$, to derive a sinusoidal roll offset.

17 Claims, 2 Drawing Sheets

US 6,470,243 B1

CORRECTION OF SPACECRAFT STEERING CONTROL LAW FOR UNEXPECTED ORBITAL INCLINATION EFFECTS

TECHNICAL FIELD

The present invention relates generally to maintaining a satellite in an orbit, and more particularly to a method of operating a satellite in an earth orbit inclined to a nominal orbit.

BACKGROUND ART

It is generally desirable to maintain certain types of satellites, such as communication satellites, in an orbit about the earth so that its location above a specific point on the earth remains fixed. This type of orbit is referred to as a geosynchronous orbit. A geosynchronous orbit enables a communication beam from the satellite to accurately cover a desired area on the surface of the earth. Any deviations from the geosynchronous orbit will alter the coverage of the beam.

To remain in a geosynchronous orbit, the satellite's nominal orbit is kept substantially within the equatorial plane of the earth. Because of these requirements, the earth's geosynchronous orbit is crowded with a multitude of satellites. As a result it is necessary to accurately maintain each of the satellites in a corresponding location in the equatorial plane.

A satellite placed in a geosynchronous orbit will experience deviations from orbit due to certain effects such as gravitational forces from the sun and moon, and variations in the gravitational force of the earth due to its oblateness. These forces tend to move the satellite in both a north/south direction, i.e. above or below the equatorial plane, and an east/west direction, i.e., left or right on the orbital path. Excursions in the north/south direction tend to move the satellite out of the equatorial plane and into an inclined orbit. To an observer at a subsatellite location, the satellite appears to move in a "figure eight" pattern once per sidereal day due to the inclined orbit.

It is also possible that the vehicle used to launch the satellite may experience an error resulting in a geosynchronous orbit being reached, but at a non-zero inclined angle as opposed to a zero inclination orbit. The resulting pointing errors from such an event may render a satellite useless unless compensation can be accomplished.

It is usual to describe the attitude in terms of an x, y, z coordinate frame, where z is directed from the satellite to the Earth center, y is directed opposite to the orbit angular velocity, and x completes a right-handed basis (approximately south along a vector normal to the orbit). The x-axis is referred to as the roll axis, the y axis is the pitch axis, and the z axis is the yaw axis.

There are a number of existing schemes for correcting an inclined orbit. It is known to correct an orbit using a pair of identical momentum wheels canted symmetrically away from the pitch axis in a plane containing the pitch axis. It has been taught that roll steering for orbit inclination-induced ground station pointing error corrections are cyclic at orbit frequency.

It has also been taught that a suitable design has an angular momentum vector of the satellite that is steerable with respect to the line of sight of an object being pointed by the satellite (such as the boresight of an antenna), or vice versa, about at least one axis, preferably the roll axis. This is done either by a single axis pointing mechanism (e.g., an antenna pointing mechanism), a single gimbaled momentum wheel, or a combination of fixed wheels. Control signals are generated to steer the angular momentum of the wheel.

Another teaching is that when the orbit inclination with respect to the equatorial plane is nonzero, a single degree of freedom system can operate an ideal satellite to point to the earth center regardless of the direction of the degree of freedom in the x-z satellite plane. For example, if the degree of freedom is along the roll axis, the angular momentum is maintained close to the north/south inertial direction. Similarly, if the degree of freedom is along the yaw axis, the angular momentum is maintained close to the inertial direction normal to the orbit plane.

In U.S. Pat. No. 4,084,772 to Muhlfelder, the angular momentum vector is placed normal to the equatorial plane, and the angular momentum is steerable with respect to the antenna boresight about the roll axis using two fixed wheels. There is a large wheel along the pitch axis, and a small wheel along the yaw axis. An open loop pointing command is introduced in the roll axis. However, this approach is not applicable with active yaw steering since the resulting sinusoidal roll motion is incorrectly coupled back into the yaw axis by way of the yaw estimator.

U.S. Pat. No. 5,100,084 to Agrawal teaches the placement of the momentum vector at a calculated point slightly past orbit normal in order to eliminate roll error. Agrawal also teaches placing the momentum vector in an obit normal/equatorial normal plane and correcting using roll and yaw gimballing means. However, Agrawal does not address the issue of cross-axis coupling.

Additionally, thrusters are typically used to periodically correct the inclination of the orbit by expending fuel, also known as north-south station keeping. North-south station keeping requires a significant amount of the satellite's propellant. In general, a satellite's useful life is limited by the station-keeping fuel requirements and the operating life of the satellite can be extended by eliminating the need for north-south station-keeping.

These known methods are either not fully compensating for linear error, not correcting for pointing at points other than earth center, or require either two-axis angular momentum steering, or that the single axis steering be about either the roll or yaw axis. Additionally, these control methods do not address the issue of recovering from a launch failure in which a satellite having active yaw steering reaches a geosynchronous orbit, but has a large inclination angle. Nor do they address the fact that active yaw steering prohibits open-loop pointing command in the roll axis.

SUMMARY OF THE INVENTION

It is an object of the present invention to control a satellite in an inclined orbit. It is another object of the present invention to extend the useful life of a satellite. It is yet another object of the present invention to provide a method of recovering from a partial launch vehicle failure.

It is a further object of the present invention to provide a method of modifying the control method used for a satellite already in orbit without making major modifications to the existing control system. It is still a further object of the present invention to align the satellite's momentum vector normal to the equatorial plane and send open loop sinusoidal roll/yaw pointing commands to the satellite's attitude control law. It is yet a further object of the present invention to control a satellite with a non-zero inclination angle using a steering law that is designed to operate at a zero inclination angle.

In carrying out the above objects, the present invention provides a method for substantially correcting pointing errors induced by an inclined orbit when using a steering law designed to operate at a zero inclination angle. The control law uses a two axis attitude sensor, such as an earth sensor, to control the spacecraft roll and pitch axes. Yaw axis pointing errors are estimated from observed roll axis activity. This control method presupposes that the orbital plane is aligned with the equatorial plane and maintains the pitch axis perpendicular to the orbit plane through active control of the roll and yaw axes.

Use of such a steering law in an inclined orbit results in a sinusoidal yaw pointing error, relative to the Earth's equator, with a magnitude equal to the inclination angle. Furthermore, an inclined orbit introduces a sinusoidal roll pointing error, relative to the equator, with a magnitude of approximately 17.8% of the inclination angle. To compensate for the yaw error, the present invention aligns the momentum vector normal to the equatorial plane and open loop sinusoidal yaw pointing commands are sent to the attitude controller. In a similar manner, open loop sinusoidal roll pointing commands are sent to the attitude controller to compensate for the roll error. By using a sinusoidal roll rate command, the present invention avoids the undesired coupling of the roll correction back into the yaw axis.

The present invention may be used to extend the useful life of the satellite, since propellant is not necessarily needed to control orbit inclination. Furthermore, the system and method of the present invention may be used to recover from a partial launch vehicle failure, in which there was insufficient on-board propellant to achieve a desired orbit by altering the control law designed for a zero inclination to control the satellite in an inclined orbit. The present invention may be applied to a satellite already in orbit with minimal effort.

These and other features of the present invention will be better understood with regard to the following description, appended claims, and accompanying drawings.

BEST MODE FOR CARRYING OUT THE INVENTION

Figure 1:
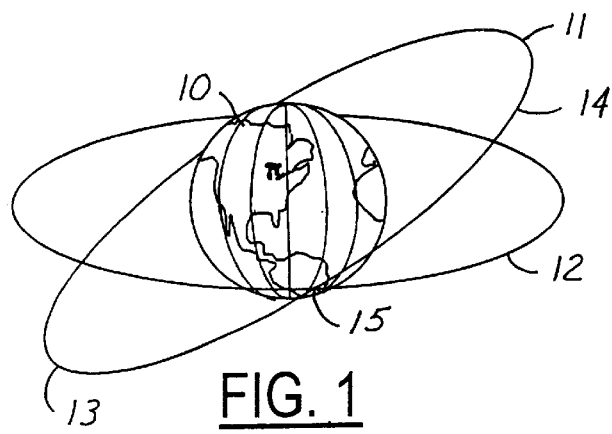
FIG. 1 is an illustration of an inclined orbit of a spacecraft.

Referring to FIG. 1 there is shown the Earth 10, an equatorial orbit 12, and an inclined orbit 14. Also shown are the high, low and midpoints of the orbit referred to as the Zenith 11, Nadir 13, and the ascending node 15, respectively.

Figure 2:
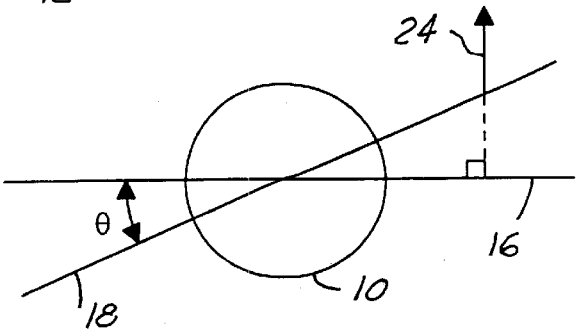
FIG. 2 is a vector diagram of the momentum vector relative to the equatorial and orbit planes.

FIG. 2 is a vector diagram in relation to the Earth 10 depicting an equatorial plane 16 of the equatorial orbit and an inclined orbit plane 18 of the inclined orbit having an inclination angle, $\Theta$.

Figure 3:
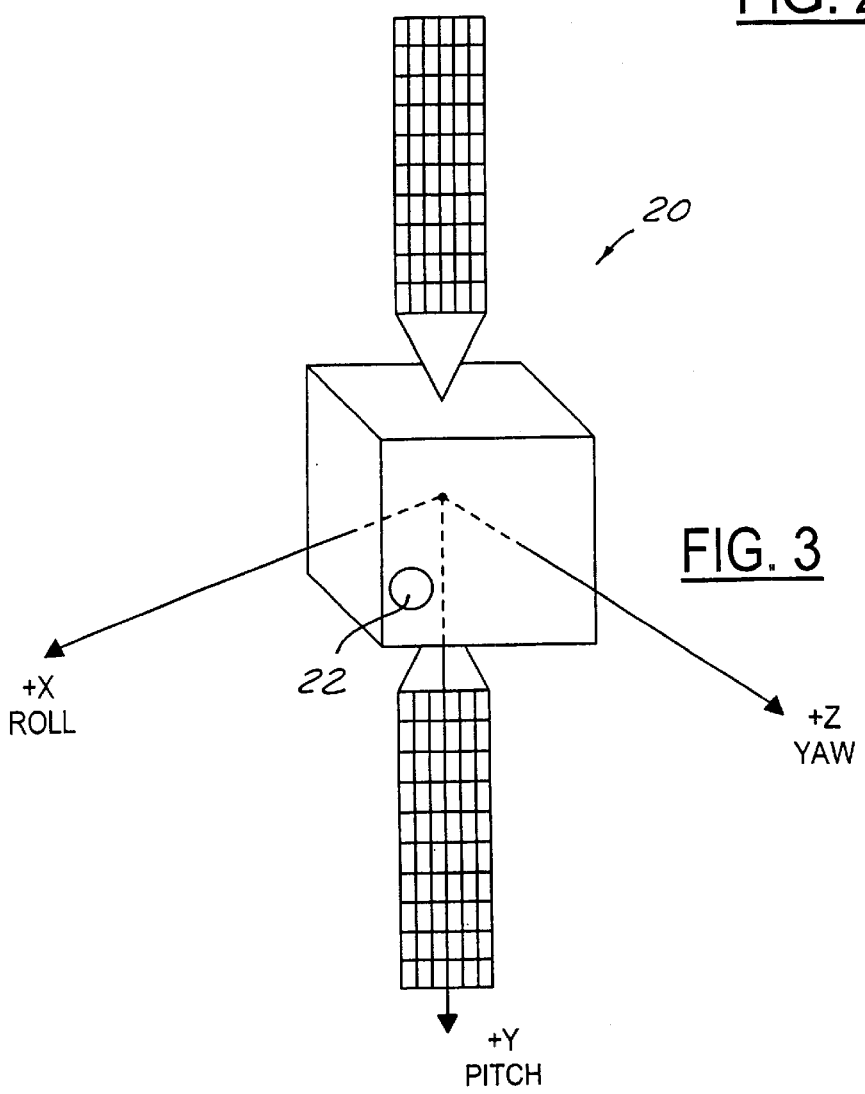
FIG. 3 is an illustration of the roll, pitch, and yaw axes of a satellite.

FIG. 3 shows a typical, three-axis stabilized, geosynchronous satellite 20. The roll, pitch and yaw axes are labeled x, y, and z respectively. For purposes of the present discussion, the satellite 20 has a zero inclination "orbit normal" attitude control steering law. However, it should be noted that one skilled in the art is capable of modifying the present invention in order to apply the concepts herein to a satellite having other control steering laws other than the specific one discussed herein. The specific example steering law discussed herein uses a two-axis attitude sensor 22, such as an earth sensor, to control the spacecraft roll and pitch axes. In general, yaw axis pointing errors are estimated from observed roll axis activity. The zero inclination, orbit normal steering law discussed herein assumes that the orbital plane of the satellite is aligned with the equatorial plane, and maintains the pitch axis perpendicular to the orbital plane.

An inclined orbit introduces a sinusoidal yaw pointing error, relative to the equator, with a magnitude equal to the inclination angle. Furthermore, an inclined orbit introduces a sinusoidal roll pointing error, relative to the equator, with a magnitude of approximately 17.8% of the inclination angle.

Figure 4:
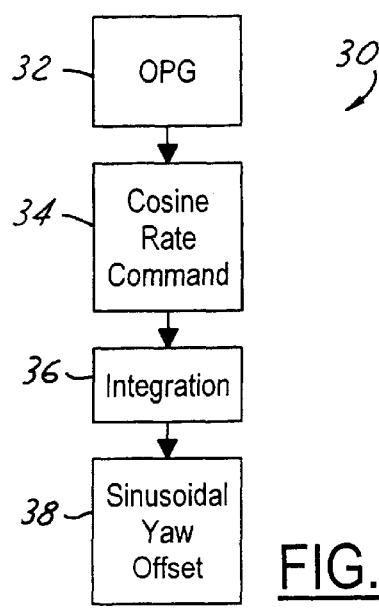
FIG. 4 is a block diagram of the system and method for correcting yaw pointing errors in accordance with the present invention.

Referring to FIG. 4, a block diagram of the system and method for yaw compensation 30 of the present invention is shown. In the present invention, yaw steering is implemented by way of a utility routine, known as an Offset Profile Generator (OPG) 32 that is located in the control processor PROM (not shown) for the satellite. The OPG utility generates a sinusoidal function in the form $A*\sin(\omega t+\phi)$. A is the amplitude, $\omega$, is the frequency of the orbit, t is the time of day, and $\phi$ is the phase offset. However, the steering law in the satellite does not allow single axis pointing commands to be entered. Therefore, according to the system and method 30 of the present invention, the OPG 32 is used to generate a cosine rate command 34, which is integrated 36 by the steering law and offset 38. The steering law and offset profile generator are specific to the particular satellite technology, and will vary depending on the application. It is possible to generate the cosine rate command using means other than the OPG as one skilled in the art is capable of doing.

The commanded rate 34 needs to be at a positive peak at nadir and a negative peak at zenith. Therefore, $\phi$ is chosen such that the term $(\omega t+\phi)$ is equal to 90 degrees at nadir.

For the specific steering law example being presented herein, the input frequency parameter, $\omega$, is set to a sidereal day of 23 hours, 56 minutes or 86,160 seconds. Consequently, $\omega=360°/86,160$ seconds or 0.0041783 deg/sec. The amplitude, A, is sized to generate a rate command which, when integrated yields a pointing command equal in amplitude to the orbit inclination. The amplitude of the cosine rate command, in deg/sec, equals $(\Theta*\omega*\pi)/180°$ where $\Theta$ is the inclination angle in degrees, $\omega$ is the frequency in deg/sec and $\pi/180$ converts $\omega$ into radians per second.

Figure 5:
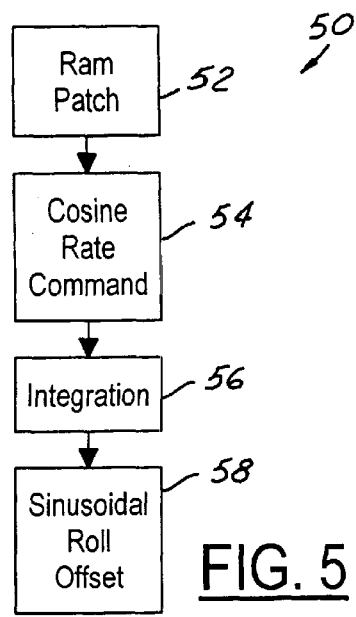
FIG. 5 is a block diagram of the system and method for correcting roll pointing errors in accordance with the present invention.

Referring now to FIG. 5, a system and method 50 for roll sinusoidal correction is implemented by way of a RAM patch 52. The RAM patch generates a sinusoidal function of the same form as the OPG, namely $A*\sin(\omega t+\phi)$. In this specific application, a RAM patch was necessary since the existing OPG utility was only capable of generating a single sinusoid and was fully utilized for yaw correction. In general, it is only necessary to have the ability of generating two independent sinusoidal functions. Hence, OPG and the RAM patch are simply a specific implementation of the present invention. Just as for the yaw steering, the control system does not allow single axis pointing commands to be entered. Consequently, the RAM patch 52 is used to generate a cosine rate command 54, which is integrated 56 by the steering law to derive a sinusoidal roll offset 58. The use of a roll rate command, as opposed to a roll angle command, also prevents the undesired coupling of the roll correction into the yaw axis by way of the yaw estimator. This technique allows roll correction to be applied to a spacecraft employing active yaw control and a yaw estimator. The commanded rate 54 needs to be at its negative peak at the ascending node. Therefore, φ is chosen such that the term (ωt+φ) is equal to 90 degrees at the descending note or ±180 degrees at nadir.

The frequency ω is set to a sidereal day of 23 hours, 56 minutes, or 86,160 seconds. Consequently, ω=(360 deg)/(86,160 sec)=0.0041783 deg/sec.

The amplitude is sized to generate a rate command 54 which, when integrated, yields a pointing command equal in amplitude to 17.8% of the orbit inclination angle. The roll rate command 54 is integrated 56 in the same manner as the yaw rate command. Hence, the rate amplitude equates to:

$$A = (0.0178 * \theta * \omega * \pi)/(180)$$

Figure 6:
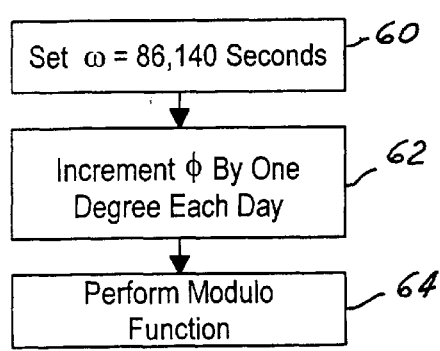
FIG. 6 is a flow chart of the maintenance method of the present invention.

In terms of daily maintenance, there are two issues associated with roll/yaw body steering, which need to be addressed. Typically, the on-board computer clock used in the (ωt+φ) term is a 24-hour clock and increments from zero to 86,400 seconds over the course of one day. The present invention requires a sinusoidal function with a 23 hour and 56 minute period. FIG. 6 is a flow diagram of how this can be accomplished. By setting ω 60 as described above and incrementing ω by one degree each day 62 when the clock rolls over at 00:00 GMT. The −1 degree transient in the ωt term is then cancelled by the +1 degree transient in the φ term. A modulo function should be performed 64 on φ such that it is bounded to a range of ±180 degrees.

Figure 7:
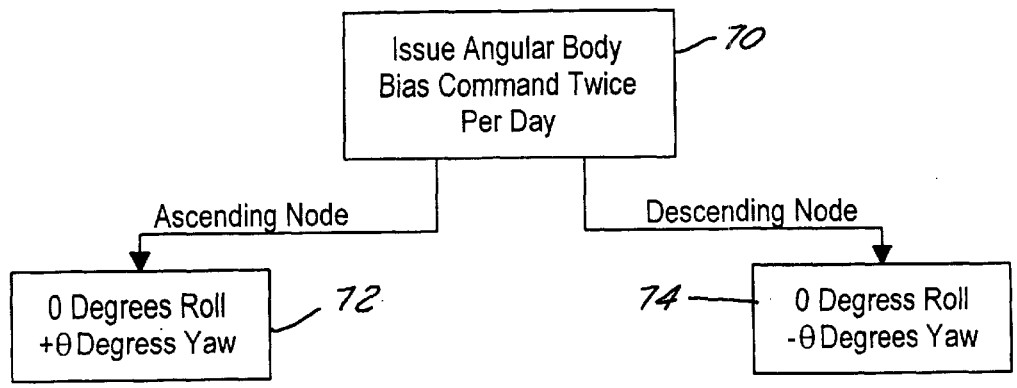
FIG. 7 is a flow chart of another embodiment of the maintenance method of the present invention.

The second issue is that the integration function on commanded rate is subject to numerical inaccuracy. The resulting angular body bias terms slowly deviate from their desired values. FIG. 7 depicts how to limit this effect. It is recommended that an angular body bias command be sent on a regular basis 70 to correct any accumulated error. The time between corrections should be such that the accumulated error is limited to acceptable bounds. In this specific example, the corrections are sent twice per day. At the ascending node, the pointing command 72 is 0 degrees roll and +Θ degrees yaw. Similarly, the pointing command 74 at the descending node is 0 degrees roll and −Θ degrees yaw. These commands 72, 74 will need to be adjusted as the orbit inclination changes as described below.

Figure 8:
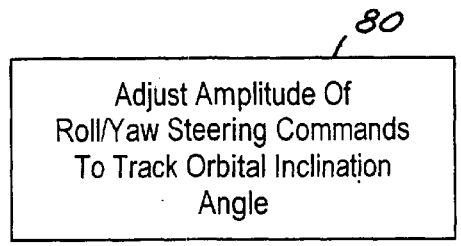
FIG. 8 is a flow chart of yet another embodiment of the maintenance method of the present invention.

Referring now to FIG. 8, the amplitude of the roll/yaw steering commands will need to be adjusted 80 to track the orbital inclination angle, which may change over time. In addition, the on-board computer clock should be periodically reset to match the time in GMT. Lastly, the actual time of occurrence for the orbit nodes should be periodically updated, as the procedures outlined above simply propagate a 1 degree (4 minute) change per day. It may be convenient to perform an orbit determination and adjust these parameters in conjunction with station-keeping activities.

Given the potential for launch vehicle failures, the present invention provides a viable technique for ensuring the ability to recover from a failed launch.

Additionally, a satellite must be retired when it runs out of fuel. The present invention foregoes north-south station-keeping for older on-orbit satellites by compensating for the resulting inclination error. A significant amount of fuel is saved when north-south station-keeping is not needed, which could possibly add years to the useful life of the satellite.

It is noted that the present invention may be used in a wide variety of different implementations encompassing many alternatives, modifications, and variations, which are apparent to those with ordinary skill in the art. Accordingly, the present invention is intended to embrace all such alternatives, modifications and variations that fall within the spirit and scope of the appended claims.

What is claimed is:

1. A system for a satellite having a pitch, roll and yaw axis, and wherein the momentum of said satellite is defined by a momentum vector, the satellite being adapted to be placed in an orbit defining a plane that has a zero inclination relative to a plane containing a geosynchronous orbit but is in an orbit having an inclination, the inclination inherently causing roll and yaw pointing errors with respect to the geosynchronous orbit, said system comprising:
   means for generating a cosine rate command for yaw steering;
   means for integrating said cosine rate command to generate a sinusoidal yaw offset;
   means for generating a cosine rate command for roll steering; and
   means for integrating said cosine rate command to generate a sinusoidal roll offset.

2. The system as claimed in claim 1 wherein said means for generating a cosine rate command for yaw steering further comprises an offset profile generator.

3. The system as claimed in claim 1 wherein said means for generating a cosine rate command for roll steering further comprises a RAM patch.

4. The system as claimed in claim 1 wherein said means for integrating said cosine rate command to generate said sinusoidal yaw offset and said sinusoidal roll offset further comprises a steering law integrator.

5. The system as claimed in claim 1 further comprising input parameters for said means for generating a cosine rate command for yaw and roll steering, said input parameters being a frequency of the orbit, an amplitude of said cosine rate command, a time equal to the time of day, and a phase offset.

6. The system as claimed in claim 5 wherein said frequency is equal to a sidereal day of 23 hours and 56 minutes.

7. A method for controlling the pointing of an orbiting satellite, the satellite having a pitch, roll and yaw axis, and wherein the momentum of the satellite is defined by a momentum vector, the satellite being adapted to be placed in an orbit defining a plane that has a zero inclination relative to a plane containing a geosynchronous orbit but is placed in an orbit having a non-zero inclination angle, the inclination inherently causing roll and yaw pointing errors with respect to the geosynchronous orbit, said method comprising the steps of:
   generating a cosine rate command for yaw correction;
   integrating said cosine rate command by a is steering law in order to derive a sinusoidal yaw offset;
   generating a cosine rate command for roll correction; and
   integrating said cosine rate command by a steering law in order to derive a sinusoidal roll offset.

8. The method as claimed in claim 7 wherein said step of generating a cosine rate command for yaw correction further comprises using an offset profile generator for generating said yaw correction cosine rate command.

9. The method as claimed in claim 7 wherein said step of generating a cosine rate command for roll correction further comprises using a RAM patch for generating said roll correction cosine rate command.

10. The method as claimed in claim 7 wherein said step of integrating said cosine rate command for said yaw correction and integrating said cosine rate command for said roll correction further comprises the step of introducing input parameters comprising an orbit frequency, a cosine rate command amplitude, a time, and a phase offset.

11. The method as claimed in claim 10 wherein said step of introducing input parameters further comprises setting said frequency equal to a 23 hour and 56 minute sidereal day.

12. The method as claimed in claim 10 wherein said step of introducing input parameters further comprises setting said yaw cosine rate command amplitude equal to the product of the non-zero inclination angle and said frequency in radians/second.

13. The method as claimed in claim 10 wherein said step of introducing input parameters further comprises setting said roll cosine rate command amplitude equal to the product of 17.8% of the non-zero inclination angle and said frequency in radians/second.

14. The method as claimed in claim 10 further comprising the step of performing daily maintenance wherein said frequency is set to a sidereal day of 23 hours and 56 minutes, and said phase offset is incremented by one degree each day at a predetermined time.

15. The method as claimed in claim 14 further comprising the step of performing a modulo function on said phase offset so that it is bounded within a range of plus or minus 180 degrees.

16. The method as claimed in claim 7 further comprising the step of correcting accumulated error by sending an angular body bias command at predetermined intervals.

17. The method as claimed in claim 10 further comprising the step of tracking the non-zero inclination angle by adjusting the cosine rate command amplitudes as required.

* * * * *